United States Patent [19]

Minton et al.

[11] 3,714,601

[45] Jan. 30, 1973

[54] VARIABLE DIRECT CURRENT BIAS CONTROL CIRCUIT FOR LINEAR OPERATION OF RADIO FREQUENCY POWER TRANSISTORS

[75] Inventors: Robert Minton, Piscataway; Constantine Kamnitsis, Stockton, both of N.J.

[73] Assignee: The United States of America as represented by the Secretary of the Navy

[22] Filed: Oct. 14, 1971

[21] Appl. No.: 189,439

[52] U.S. Cl. ....................330/29, 330/40

[51] Int. Cl. ....................H03g 3/30

[58] Field of Search ....................330/22, 29, 40

[56] References Cited

UNITED STATES PATENTS

| | | | |
|---|---|---|---|
| 3,374,442 | 3/1968 | Griffin | 330/40 |
| 3,456,205 | 7/1969 | Schmitt | 330/29 |
| 3,513,406 | 5/1970 | Lenthauser | 330/40 |

*Primary Examiner*—Roy Lake
*Assistant Examiner*—James B. Mullins
*Attorney*—R. S. Sciascia and P. S. Collignon

[57] ABSTRACT

A variable direct current (D.C.) bias control circuit for linear gain operation of a radio frequency (R.F.) power transistor having a DC amplifier coupled to sense the change in voltage drop across a biasing resistor of the RF power transistor and operative to maintain this voltage drop constant to provide a linear gain of the power transistor throughout 10 percent to 90 percent of its rated power output within a 1½ decibel (db) variation.

1 Claim, 3 Drawing Figures

VARIABLE DIRECT CURRENT BIAS CONTROL CIRCUIT FOR LINEAR OPERATION OF RADIO FREQUENCY POWER TRANSISTORS

BACKGROUND OF THE INVENTION

This invention relates to a means to control the output of an RF transistor amplifier by control of power gain and more particularly to sense attempted changes in DC bias of the RF amplifier by a DC amplifier to re-establish or maintain the DC bias throughout the power range of the RF amplifier regardless of RF signal amplitude changes.

In prior known RF power outputs the power gain is often controlled in steps or on voltage platforms to provide maximum and minimum power limits. Where RF power is attempted to be controlled in a linear manner, there is considerable db variation from the bottom to the top of the rated RF power output resulting in distortion of RF signals. Many circuits have been devised to control this power gain within limited range with gating circuits of desirable range at desirable times. Such circuits do not provide true linear operation of the RF power output resulting in signal distortion.

SUMMARY OF THE INVENTION

In the present invention an RF transistor power amplifier is controlled in gain by a bias voltage established by a biasing resistor on the transistor base. Changes in voltage across this biasing resistor caused by changes in RF power amplitude is sensed by a DC amplifier which is operative to maintain the emitter voltage drop across the biasing resistor nearly constant thus maintaining a more nearly constant bias on the transistor power amplifier base thereby holding the RF power gain substantially linear over a wide range of changes in RF power amplitude applied to the RF power transistor. The DC amplifier operates on the biasing resistor in direct opposition to changes produced by RF amplitude input to hold the voltage drop across the biasing resistor substantially constant. Accordingly it is a general object of this invention to provide a variable DC base current bias for an RF power transistor which changes as a function of RF driving signal level to maintain a substantially linear gain over a wide range of RF signal amplitude.

BRIEF DESCRIPTION OF THE DRAWINGS

These and other objects and the attendant advantages, features, and uses of the invention will become more apparent as a more detailed description proceeds when considered along with the accompanying drawing in which.

DESCRIPTION OF THE PREFERRED EMBODIMENT

Figure 1:
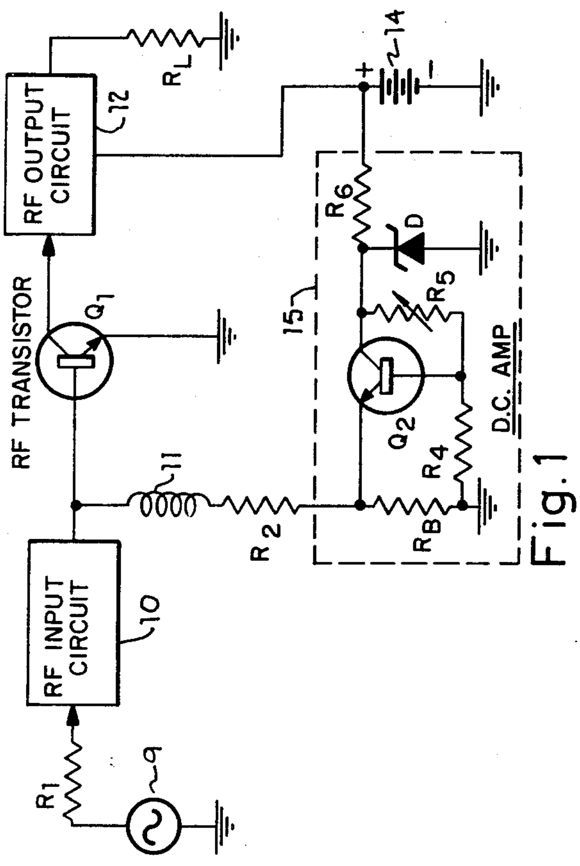
FIG. 1 is a block circuit schematic of one embodiment of the invention.

Referring more particularly to FIG. 1 the RF source at 9 applies RF signals through a coupling resistor R1 to an RF input circuit 10 consisting of a tuned impedance matching network, as well understood by those skilled in the art. The output of the RF input circuit 10 is applied directly to the base of an RF transistor amplifier Q1, the emitter of which is coupled to a common potential such as ground. The collector output of transistor Q1 is applied through an RF output circuit consisting of a tuned impedance matching network 12 to an RF load, illustrated herein as $R_L$. The collector voltage is supplied from a source 14, herein illustrated as being a battery, through the RF output circuit 12, as well understood by those skilled in the art. The base of RF transistor Q1 is coupled to a base biasing resistor $R_B$ through a fixed resistance R2 and an RF choke 11. This is a basic circuit for an RF transistor amplifier of RF signals originating at 9 and produced across a load $R_L$.

The biasing resistor $R_B$ is variably controlled by a DC amplifier circuit, shown generally within the dotted line area 15, having a transistor Q2 with the emitter and base thereof coupled across the biasing resistor $R_B$. The base is coupled in a voltage divider circuit consisting of a fixed resistor R4 and a potentiometer R5 coupled between the common potential and the source 14. The collector of the DC transistor amplifier Q2 is coupled through a fixed resistor R6 to the collector voltage source 14. A Zener diode D has its cathode coupled to the collector of Q2 and its anode coupled to the common potential such as ground to limit and regulate the collector voltage at the collector of transistor Q2. In situations where the collector voltage source 14 is a 28 DC voltage, the Zener diode may be of the order of 15 volts providing 15 volts constant voltage at the collector of transistor Q2. The potentiometer R5 is adjusted to establish 0.3 of a volt, in one example, across the biasing resistor $R_B$ when no RF signals are present on the base of the RF transistor Q1. In this embodiment the same collector voltage source 14 is used for both the RF transistor amplifier and the DC amplifier in controlling the gain of the RF transistor Q1. This collector voltage source, illustrated as a battery 14 herein, may be a voltage source from a generator and battery circuit such as that of an aircraft in which transient voltages may appear which would destroy the control of the DC amplifier Q2 without the diode D limiting and stabilizing this collector voltage.

Figure 2:
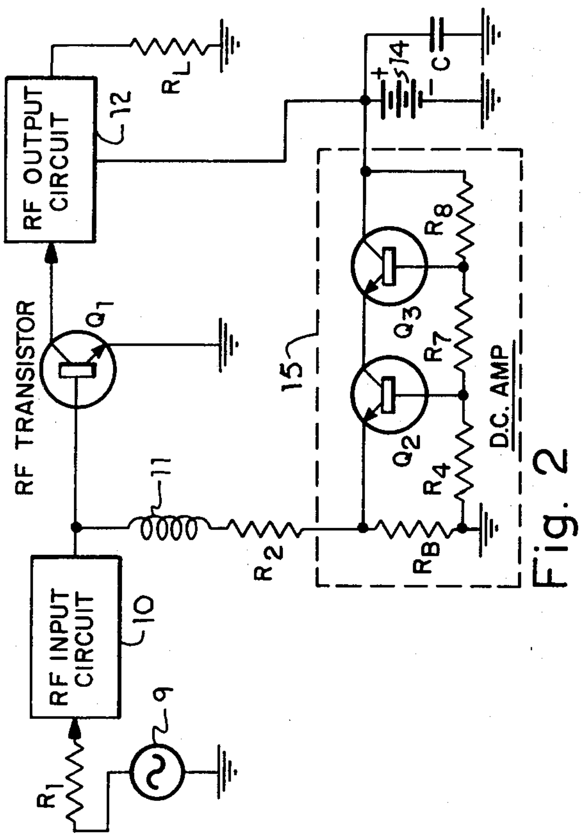
FIG. 2 is a block circuit schematic of another embodiment of the invention.

Referring more particularly to FIG. 2 the primary RF input, output, and RF transistor amplifier circuits are the same as those in FIG. 1 and identified by the same reference characters. In this modification the diode D is replaced with a second transistor Q3 having its collector and emitter coupled in series with the collector and emitter of transistor Q2. The base terminals of transistors Q2 and Q3 are coupled to a voltage divider circuit consisting of resistors R4, R7, and R8 between the common or ground potential and the collector voltage supply. Transistor Q3 substantially stabilizes the collector voltage for transistor Q2 in like manner as the Zener diode D of FIG. 1. Transistors Q2 and Q3 divide the voltage down to a usable amount for the biasing resistor $R_B$ but a single transistor could be used if it has sufficiently high voltage capabilities, such as an RCA 2N3440. In this embodiment a capacitor C is coupled across the collector voltage source to filter out alternating currents of the collector voltage.

OPERATION

Figure 3:
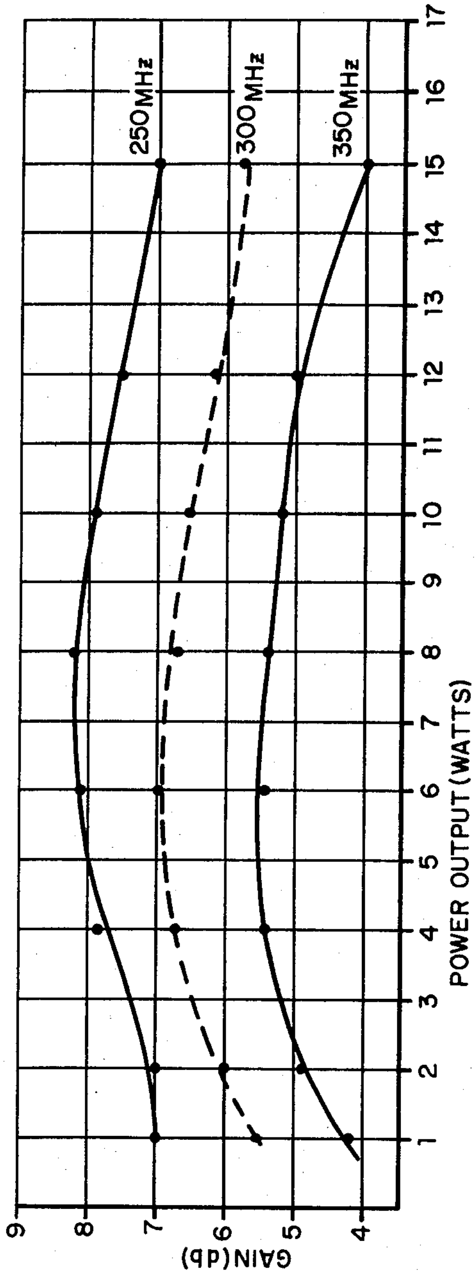
FIG. 3 shows graphs of the gain linearity variation as a function of the output power of the RF amplifier.

In the operation of the embodiment shown in FIG. 1 let it be assumed for the purpose of example, not in any way limiting to the invention, that the several resistors, transistors, diode, and potentiometer have the following values:

$R_B$ = 50 Ohms
R2 = 10 Ohms
R4 = 1,500 Ohms
R5 = 25,000 Ohms
R6 = 750 Ohms
D — 1N965B
Q1 — 2N2102
14 — $V_{cc}$ = 28 VDC In the absence of an RF signal from 9, the DC amplifier Q2 is biased and adjusted by the potentiometer R5 to establish a voltage drop of 0.3 of a volt across the biasing resistor $R_B$. This bias is applied through R2 and the RF choke 11 of low impedance to the base of the RF transistor amplifier Q1 setting in the gain factor. Upon the application of an RF signal from 9 to the base of the RF transistor amplifier Q1, a base emitter circuit will be established tending to lower the voltage drop across the biasing resistor $R_B$. The RF signals will be blocked by the RF choke 11 to maintain a pure DC bias on the base of Q1. As this base biasing voltage across $R_B$ attempts to drop the base-to-emitter voltage of Q2 becomes less to increase the current flow through Q2 from the collector source 14 to raise the voltage drop across $R_B$, or in other words, to maintain the 0.3 volt across $R_B$ in a stable manner. The base-emitter current of the RF transistor Q1 provides a rectifying action, the amplitude of which is directly proportional to the amplitude of the RF signals applied to the base of transistor Q1. As the amplitude of the base current of Q1 increases, it will tend to drop the voltage across the biasing resistor $R_B$ more. This tendency to decrease the voltage drop across $R_B$ raises the base voltage of Q2 with respect to its emitter and tends to increase the emitter collector current flow to raise the voltage across the biasing resistor $R_B$ thereby providing substantially a constant voltage source across $R_B$. The operation of the DC amplifier 15 to maintain 0.3 of a volt across the biasing resistor $R_B$ establishes a more nearly constant bias on the base of the RF transistor Q1 to maintain a nearly constant gain factor or linear gain for this RF transistor. It has been found by the example of the values of the elements given hereinabove that this power gain is substantially linear from 10 to 90 percent of the rated power output of the Rf transistor Q1 with not more than a 1½ db variation. This is more clearly shown in the graph of FIG. 3 for three different RF frequencies of 250 MHz, 300 MHz and 350 MHz.

The operation of the embodiment shown in FIG. 2 is substantially the same as that shown and described for FIG. 1 except that the voltage regulating transistor Q3 divides any spurious voltages from the collector voltage source 14 applied to the collector of transistor Q2 greatly reducing any collector voltage variations on Q2 providing sufficient regulation so that transistor Q2 will operate as a DC amplifier to maintain 0.3 of a volt across the biasing resistor $R_B$. In this embodiment the following resistor values are used:

R4 = 1,200 Ohms
R7 = 18,000 Ohms
R8 = 15,000 Ohms

The second transistor Q3 is of the same type as used for transistor Q2. In this manner a variable DC bias control circuit is provided by the DC amplifier 15 to maintain a constant voltage drop across the biasing resistor $R_B$ to provide substantially constant gain and linear operation of the RF transistor amplifier Q1 for RF signals of the amplitude modulated type.

While many modifications may be made in the constructional details of the embodiments disclosed by the change of values for the several elements, it is to be understood that we desire to be limited in our invention only by the scope of the appended claim.

We claim:

1. A variable direct current bias control circuit for linear operation of radio frequency power transistors comprising:

a radio frequency transistor amplifier having its base electrode coupled to an input circuit of radio frequency signals, its collector electrode coupled to a collector voltage source and an output circuit, and its emitter electrode coupled to a common potential;

a biasing resistor coupled across the base electrode and emitter electrode of said radio frequency transistor amplifier to establish a gain factor for said amplifier;

a direct current transistor amplifier having said biasing resistor coupled across its emitter and base electrodes, the base electrode being coupled to a voltage divider circuit, and the collector electrode being coupled to said collector voltage source; and a transistor having its emitter and collector electrodes coupled in series with the emitter and collector electrodes of said direct current transistor amplifier and its base biased from said collector voltage source to limit the current from said collector voltage source to said direct current transistor amplifier, whereby any attempted voltage drop across said biasing resistor resulting from increasing changes in radio frequency driving signal is compensated by increase in voltage across said biasing resistor by said direct current transistor amplifier to maintain the gain of said radio frequency transistor amplifier substantially constant.

* * * * *